(12) United States Patent
Yang et al.

(10) Patent No.: US 9,848,013 B1
(45) Date of Patent: *Dec. 19, 2017

(54) PERFECT FORWARD SECRECY DISTRIBUTED DENIAL OF SERVICE ATTACK DETECTION

(71) Applicant: A10 Networks, Inc., San Jose, CA (US)

(72) Inventors: Yang Yang, San Jose, CA (US); Ali Golshan, Palo Alto, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,345

(22) Filed: Feb. 5, 2015

(51) Int. Cl.
G08B 23/00 (2006.01)
H04L 29/06 (2006.01)

(52) U.S. Cl.
CPC .......... H04L 63/1458 (2013.01); H04L 67/42 (2013.01)

(58) Field of Classification Search
CPC ..... G06F 21/64; G06F 21/645; H04L 9/3273; H04L 63/062
USPC ............................................. 726/22
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,511,122 A | 4/1996 | Atkinson |
| 5,584,023 A | 12/1996 | Hsu |
| 5,684,875 A | 11/1997 | Ellenberger |
| 5,757,908 A | 5/1998 | Cooper et al. |
| 5,805,801 A | 9/1998 | Holloway et al. |
| 5,835,727 A | 11/1998 | Wong et al. |
| 5,892,903 A | 4/1999 | Klaus |
| 5,905,859 A | 5/1999 | Holloway et al. |
| 5,940,002 A | 8/1999 | Finn et al. |

(Continued)

FOREIGN PATENT DOCUMENTS

| | | |
|---|---|---|
| TW | 477140 | 2/2002 |
| TW | 574655 | 2/2004 |

(Continued)

OTHER PUBLICATIONS

Castelluccia et al, Improving Secure Server Performance by Rebalancing SSL/TLS Handshake, ACM, Mar. 24, 2006, pp. 26-34.*

(Continued)

*Primary Examiner* — Luu Pham
*Assistant Examiner* — Jenise Jackson
(74) *Attorney, Agent, or Firm* — AMPACC Law Group, LLC; Keith Kline (57) ABSTRACT

Provided are methods and systems for detecting a DoS attack when initiating a secure session. A method for detecting a DoS attack may commence with receiving, from a client, a request to initiate a secure session between the client and a server. The method may continue with sending a pre-generated key to the client. The method may further include establishing that the request from the client is suspected of the DoS attack. The establishment may be performed based on further actions associated with the client.

17 Claims, 5 Drawing Sheets

(56) References Cited

U.S. PATENT DOCUMENTS

| | | |
|---|---|---|
| 5,960,177 A | 9/1999 | Tanno |
| 6,006,272 A | 12/1999 | Aravamudan et al. |
| 6,170,061 B1 | 1/2001 | Beser |
| 6,185,681 B1 | 2/2001 | Zizzi |
| 6,205,115 B1 | 3/2001 | Ikebe et al. |
| 6,219,706 B1 | 4/2001 | Fan et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,539,435 B2 | 3/2003 | Bolmarcich et al. |
| 6,553,005 B1 | 4/2003 | Skirmont et al. |
| 6,578,147 B1 | 6/2003 | Shanklin et al. |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,973,040 B1 | 12/2005 | Ricciulli |
| 6,988,106 B2 | 1/2006 | Enderwick et al. |
| 7,092,357 B1 | 8/2006 | Ye |
| 7,194,766 B2 | 3/2007 | Noehring et al. |
| 7,200,760 B2 | 4/2007 | Riebe et al. |
| 7,221,757 B2 | 5/2007 | Alao |
| 7,234,161 B1 | 6/2007 | Maufer et al. |
| 7,277,963 B2 | 10/2007 | Dolson et al. |
| 7,372,809 B2 | 5/2008 | Chen et al. |
| 7,392,241 B2 | 6/2008 | Lin et al. |
| 7,409,712 B1 | 8/2008 | Brooks et al. |
| 7,418,733 B2 | 8/2008 | Connary et al. |
| 7,478,429 B2 | 1/2009 | Lyon |
| 7,533,409 B2 | 5/2009 | Keane et al. |
| 7,543,052 B1 | 6/2009 | Cesa Klein |
| 7,577,833 B2 | 8/2009 | Lai |
| 7,596,695 B2 | 9/2009 | Liao et al. |
| 7,620,733 B1 | 11/2009 | Tzakikario et al. |
| 7,665,138 B2 | 2/2010 | Song et al. |
| 7,739,494 B1* | 6/2010 | McCorkendale ... H04L 63/0823 713/152 |
| 7,823,194 B2 | 10/2010 | Shay |
| 7,845,004 B2 | 11/2010 | Bardsley et al. |
| 7,925,766 B2 | 4/2011 | Jayawardena et al. |
| 7,953,855 B2 | 5/2011 | Jayawardena et al. |
| 8,010,469 B2 | 8/2011 | Kapoor et al. |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,375,453 B2 | 2/2013 | Jackson et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,813,228 B2 | 8/2014 | Magee et al. |
| 8,832,832 B1 | 9/2014 | Visbal |
| 8,881,284 B1* | 11/2014 | Gabriel ................. G06F 21/566 709/203 |
| 8,948,380 B2* | 2/2015 | Goto ........................ H04L 9/08 380/44 |
| 9,129,116 B1* | 9/2015 | Wiltzius ................ G06F 21/577 |
| 9,130,996 B1 | 9/2015 | Martini |
| 9,215,208 B2 | 12/2015 | Fraize et al. |
| 9,245,121 B1 | 1/2016 | Luo et al. |
| 9,246,926 B2 | 1/2016 | Erlingsson et al. |
| 9,294,503 B2 | 3/2016 | Thompson et al. |
| 9,300,623 B1 | 3/2016 | Earl et al. |
| 9,537,886 B1 | 1/2017 | Gareau |
| 9,571,465 B1 | 2/2017 | Sharifi Mehr et al. |
| 9,584,318 B1 | 2/2017 | Yang et al. |
| 2001/0042204 A1 | 11/2001 | Blaker et al. |
| 2002/0087708 A1 | 7/2002 | Low et al. |
| 2002/0108059 A1* | 8/2002 | Canion ............... H04L 12/2602 726/13 |
| 2002/0165912 A1* | 11/2002 | Wenocur ............. G06Q 10/107 709/203 |
| 2002/0188839 A1 | 12/2002 | Noehring et al. |
| 2003/0023846 A1 | 1/2003 | Krishna et al. |
| 2003/0023876 A1 | 1/2003 | Bardsley et al. |
| 2003/0028585 A1 | 2/2003 | Yeager et al. |
| 2003/0035547 A1 | 2/2003 | Newton |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0148520 A1 | 7/2004 | Talpade et al. |
| 2004/0172538 A1 | 9/2004 | Satoh et al. |
| 2004/0187032 A1 | 9/2004 | Gels et al. |
| 2005/0021999 A1 | 1/2005 | Touitou et al. |
| 2005/0041584 A1 | 2/2005 | Lau et al. |
| 2005/0044068 A1 | 2/2005 | Lin et al. |
| 2005/0044352 A1 | 2/2005 | Pazi et al. |
| 2005/0125684 A1 | 6/2005 | Schmidt |
| 2005/0180416 A1 | 8/2005 | Jayawardena et al. |
| 2005/0193199 A1* | 9/2005 | Asokan ................ H04L 63/062 713/168 |
| 2005/0198099 A1 | 9/2005 | Motsinger et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0179319 A1* | 8/2006 | Krawczyk .......... G06Q 20/3678 713/180 |
| 2006/0185014 A1 | 8/2006 | Spatscheck et al. |
| 2006/0230444 A1 | 10/2006 | Iloglu et al. |
| 2006/0265585 A1 | 11/2006 | Lai |
| 2007/0143769 A1 | 6/2007 | Bu et al. |
| 2007/0157027 A1* | 7/2007 | Palekar ............... H04L 63/0428 713/171 |
| 2007/0169194 A1 | 7/2007 | Church et al. |
| 2007/0186282 A1 | 8/2007 | Jenkins |
| 2007/0214088 A1* | 9/2007 | Graham ............... H04L 63/1416 705/51 |
| 2007/0280114 A1 | 12/2007 | Chao et al. |
| 2007/0283429 A1 | 12/2007 | Chen et al. |
| 2008/0183885 A1 | 7/2008 | Durrey et al. |
| 2008/0256623 A1 | 10/2008 | Worley et al. |
| 2009/0077663 A1 | 3/2009 | Sun et al. |
| 2009/0083537 A1* | 3/2009 | Larsen ................ H04L 63/0281 713/153 |
| 2009/0168995 A1 | 7/2009 | Banga et al. |
| 2010/0131646 A1 | 5/2010 | Drako |
| 2010/0138921 A1 | 6/2010 | Na et al. |
| 2010/0284300 A1 | 11/2010 | Deshpande et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0138177 A1 | 6/2011 | Qiu et al. |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |

(56) References Cited

U.S. PATENT DOCUMENTS

| | | | |
|---|---|---|---|
| 2012/0110472 A1 | 5/2012 | Amrhein et al. | |
| 2012/0144461 A1 | 6/2012 | Rathbun | |
| 2012/0155274 A1 | 6/2012 | Wang et al. | |
| 2012/0159623 A1 | 6/2012 | Choi | |
| 2012/0163186 A1 | 6/2012 | Wei et al. | |
| 2012/0170753 A1* | 7/2012 | Pandrangi | G06F 21/6209 380/286 |
| 2012/0173684 A1 | 7/2012 | Courtney et al. | |
| 2012/0174196 A1* | 7/2012 | Bhogavilli | H04L 63/1458 726/5 |
| 2012/0227109 A1 | 9/2012 | Dimuro | |
| 2012/0250866 A1* | 10/2012 | Matsuo | H04L 9/0841 380/279 |
| 2012/0260329 A1* | 10/2012 | Suffling | H04L 63/1458 726/9 |
| 2012/0266242 A1 | 10/2012 | Yang et al. | |
| 2013/0019025 A1 | 1/2013 | Chaturvedi et al. | |
| 2013/0103834 A1 | 4/2013 | Dzerve et al. | |
| 2013/0139245 A1 | 5/2013 | Thomas | |
| 2013/0198845 A1 | 8/2013 | Anvari | |
| 2013/0212265 A1 | 8/2013 | Rubio Vidales et al. | |
| 2013/0227646 A1* | 8/2013 | Haggerty | H04L 63/0853 726/3 |
| 2013/0243194 A1* | 9/2013 | Hawkes | H04L 63/067 380/270 |
| 2013/0263256 A1 | 10/2013 | Dickinson et al. | |
| 2014/0137190 A1 | 5/2014 | Carey et al. | |
| 2014/0269308 A1 | 9/2014 | Oshiba | |
| 2014/0280832 A1 | 9/2014 | Oshiba | |
| 2014/0325588 A1 | 10/2014 | Jalan et al. | |
| 2014/0325648 A1* | 10/2014 | Liu | H04L 63/1458 726/22 |
| 2014/0344925 A1 | 11/2014 | Muthiah | |
| 2015/0033341 A1 | 1/2015 | Schmidtler et al. | |
| 2015/0058977 A1 | 2/2015 | Thompson et al. | |
| 2015/0143118 A1* | 5/2015 | Sheller | H04L 9/3223 713/168 |
| 2015/0220745 A1 | 8/2015 | Nellitheertha et al. | |
| 2015/0281177 A1* | 10/2015 | Sun | H04L 63/1458 726/11 |
| 2015/0326685 A1* | 11/2015 | Erickson | H04L 29/06 709/213 |
| 2015/0381585 A1* | 12/2015 | Vaterlaus | H04L 63/0485 713/171 |
| 2016/0036651 A1* | 2/2016 | Sureshchandra | H04L 67/16 709/217 |
| 2016/0134655 A1 | 5/2016 | Thompson et al. | |
| 2016/0182509 A1 | 6/2016 | Kantecki et al. | |
| 2016/0226896 A1* | 8/2016 | Bhogavilli | H04L 63/1458 |
| 2016/0344836 A1* | 11/2016 | Erickson | H04L 29/06 |

FOREIGN PATENT DOCUMENTS

| | | |
|---|---|---|
| TW | N1197237 | 2/2004 |
| TW | I225999 | 1/2005 |
| TW | 1241818 | 10/2005 |
| TW | 1252976 | 4/2006 |
| WO | WO1998042108 | 9/1998 |
| WO | WO1999048303 A2 | 9/1999 |
| WO | WO2000062167 A1 | 10/2000 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

Lin et al, Counteract Syn Flooding Using Second Chance Packet Filtering, ACM, Jan. 16, 2009, pp. 216-220.*

Dainotti, Albert et al. Tie: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Oracle Corporation. Oracle Intelligent Agent User's Guide, Release 9.2.0, Part No. A96676-01. Mar. 2002.

SOL11243. iRules containing the RULE_INIT iRule event do not re-initialize when a syntax error is corrected. f5. support.com May 24, 2010.

Mutz, "Linux Encryption How To," available at http://encryptionhowto.sourceforge.net/Encryption-HOWTO-1.html.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Lee, Patrick P. C. et al., "On the Detection of Signaling DoS Attacks on 3G Wireless Networks," IEEE INFOCOM 2007—26th IEEE International Conference on Computer Communications processings, May 6-12, 2007, pp. 1289-1297.

Spatscheck et al., "Optimizing TCP Forwarder Performance", IEEE/ACM Transactions on Networking, vol. 8, No. 2, Apr. 2000, pp. 146-157.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Liebergeld, Steffen et al., "Cellpot: A Concept for Next Generation Cellular Network Honeypots," Internet Society, Feb. 23, 2014, pp. 1-6.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retrieved from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retreived from the Internet: <URL:http://www.unizh.ch/home/mazzo/reports/www7conf/fullpapers/1899/com1899.htm>, 14 pages.

* cited by examiner

PERFECT FORWARD SECRECY DISTRIBUTED DENIAL OF SERVICE ATTACK DETECTION

TECHNICAL FIELD

This disclosure relates generally to computer and network security and, more particularly, to perfect forward secrecy (PFS) distributed denial of service (DDoS) attack defense.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

PFS is a property of key-agreement protocols ensuring that compromising of a session key derived from long-term keys is impossible even if one of the long-term keys is compromised in the future. By using a key-agreement protocol, two or more parties can agree on the session key in such a way that that all parties influence the generated session key. The PFS can be used in the Secure Sockets Layer (SSL) cryptographic protocol. The SSL protocol may use asymmetric cryptography to authenticate the counterparty with which the protocol is communicating. The asymmetric cryptography is a cryptographic algorithm that requires two separate keys, referred to as a private key and a public key, to encrypt and decrypt data flowing between parties. The private key and the public key can be mathematically linked so that encryption of an encryption key, also referred to as a session key, by one party using the public key allows decryption of the session key by another party using the private key. Therefore, before beginning to exchange information protected by the SSL protocol, a client and a server must securely exchange or agree upon the session key to use when encrypting data flowing between the client and the server.

SSL sessions between the client and the server commence with a PFS handshake procedure that includes a process of negotiation that dynamically sets parameters of a communications channel established between the client and the server. Some steps of the handshake procedure may be very expensive by requiring the server to perform time and resource consuming computations to generate a public key for transmission to the client. An attacker may take advantage of such workload on the server and send multiple session requests to the server without any intent to establish a valid session. The attacker can simply terminate the connection after receiving a public key generated by the server and immediately reconnect with a new request. Alternatively, the attacker may respond to the server by sending random numbers instead of generating and encrypting a valid session key based on the received public key. As such actions of the attacker can easily overwhelm the capacity of the server or interrupt proper functioning of the server, they can be used in a denial of service (DoS) attack or, in case of distributed attackers, a Distributed DoS (DDoS) attack on the server.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for detecting a DoS attack when initiating a secure session. Specifically, a method for detecting a DoS attack may commence with receiving, from a client, a request to initiate a secure session between the client and a server. The method may continue with sending a pre-generated key to the client. The method may further include establishing that the request from the client is suspected of the DoS attack. The establishment may be performed based on further actions associated with the client.

According to another approach of the present disclosure, there is provided a system for detecting a DoS vice attack. The system may comprise at least one processor. The processor may be operable to receive, from a client, a request to initiate a secure session between the client and a server. The processor may be further operable to send a pre-generated key to the client to establish the secure session. The processor may be further operable to establish, based on further actions associated with the client, that the request from the client is suspected of the DoS attack.

In further example embodiments of the present disclosure, the method operations are stored on a machine-readable medium comprising instructions, which when implemented by one or more processors perform the recited operations. In yet further example embodiments, hardware systems, or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure refer to detecting a DoS attack. A system for detecting a DoS attack can be responsible for detecting DoS attacks directed to a server. According to the present disclosure, a secure session can include an SSL session between a client and a server that begins with an exchange of messages, also referred to as an SSL handshake procedure. The client may contact the server by informing the server that the client wants to communicate with the server using the PFS. In other words, the client may send a request for initiating the secure session with the server. The request may include an SSL version number that the client supports, randomly generated data, cipher settings, and other information the server needs in order to establish an SSL session with the client. Providing such data to the server is not very resource-consuming for the client. In response to the request, the server may send an SSL version number supported by the server, randomly generated data, cipher settings, and other information that the client needs to communicate with the server using the SSL. Typically, the server can also send a key exchange message to the client. The key exchange message may include a public key. Because generation of the public key consumes a lot of computational resources of the server, it would be advantageous for the server to ensure that the client is not an attacker with intent to mount a DoS attack on the server.

To detect DoS attacks, the server may investigate validity of the client. For this purpose, the server may determine whether the client is on a whitelist. The whitelist may include a list of trusted clients, for example, clients that have previously established secure sessions with the server. If the client is on the whitelist, the server may continue with the conventional SSL handshake procedure. If, on the other hand, the client is not on the whitelist (i.e. the client is unknown), the server may send a pre-generated key to the client instead of performing the computation of the public key. The pre-generated key may be stored in a database associated with the server. After sending the pre-generated key, the server may monitor the client's further actions for any suspicious activities. The suspicious activities can include lack of response to the public key received from the server, sending random data in response to the public key instead of generating a premaster key, and repetitively closing and opening connections with the server without responding to the public key.

If the server had to generate a new key instead of using the pre-generated key each time a request is received from the client, the capacity of the server could be overwhelmed. However, sending the pre-generated key is not computationally expensive and allows the server to investigate the client prior to establishing a session and, possibly, detect and prevent a DoS attack.

If the client demonstrates its validity by sending a premaster key encrypted using the public key received from the server, the server can force a renegotiation of the secure session with the client. More specifically, the server may generate a new public key and send the new public key to the client. According to the conventional SSL handshake procedure, after receiving the new public key, the client may use the public key to encrypt a premaster key generated by the client. The server may receive the premaster key from the client. The server may use a private key of the server to decrypt the premaster key, and then both the server and the client may generate a master key based on the premaster key. Both the client and the server may use the master key to generate a session key, which is a symmetric key used to encrypt and decrypt data exchanged during the SSL secure session between the server and the client. Therefore, both the client and the server may generate the session key and encrypt the session key using the public key. The client may decrypt the session key received from the server using a private key of the client. Similarly, the server may decrypt the session key received from the client using the private key of the server. Therefore, no decryption key allowing decrypting data flowing between the client and the server is going across the wire.

Figure 1:
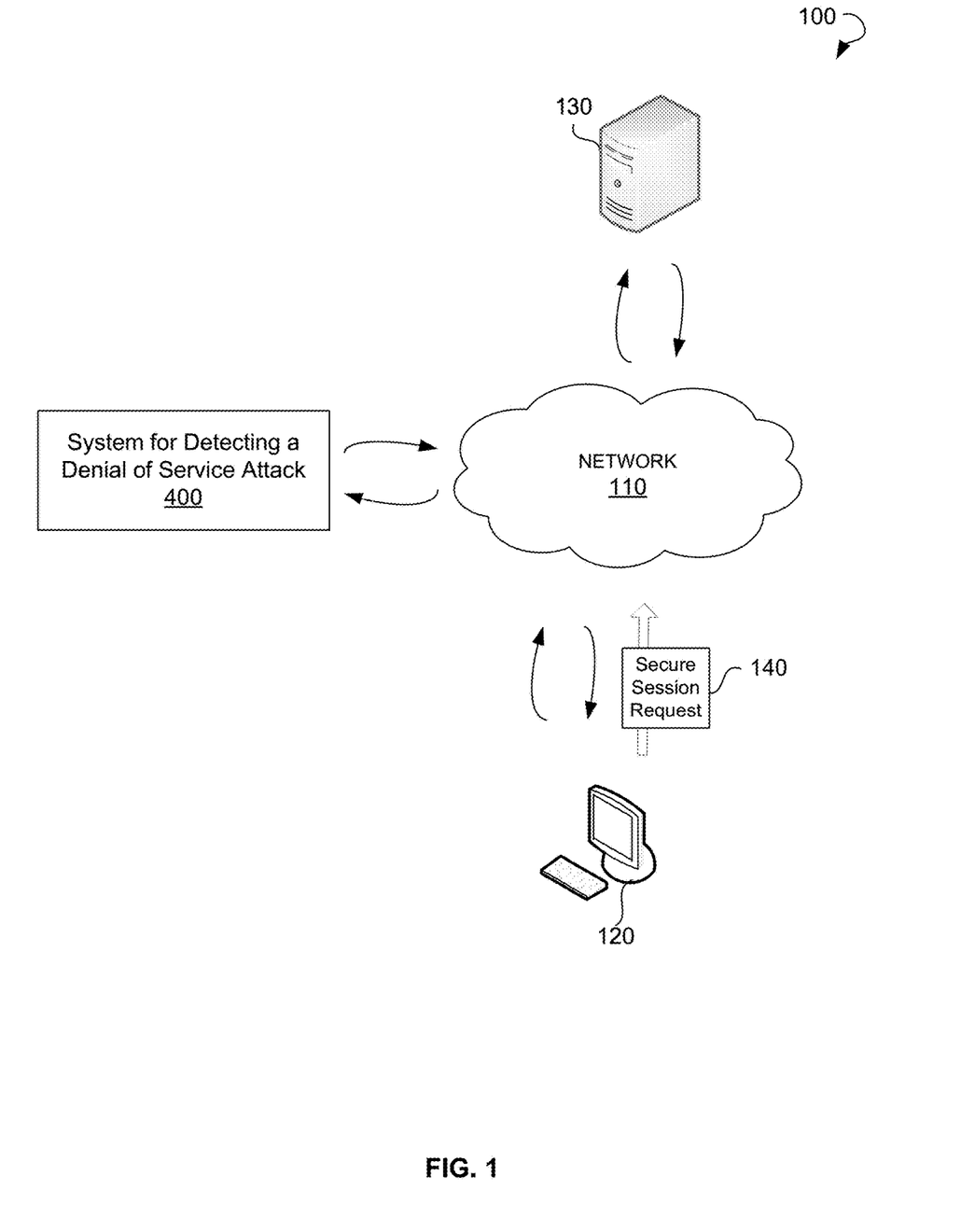
FIG. 1 shows an environment within which methods and systems for detecting a DoS attack when initiating a secure session can be implemented.

Referring now to the drawings, FIG. 1 illustrates an environment 100 within which methods and systems for detecting a DoS attack when initiating a secure session can be implemented. The environment 100 may include a network 110, a client 120, a server 130, and a system 400 for detecting a DoS attack. The client 120 may include a network machine or a network resource that sends a request 140 for initiating a secure session to the server 130. The client 120 may communicate with the server 130 using the network 110.

The network 110 may include the Internet or any other network capable of communicating data between devices. Suitable networks may include or interface with any one or more of, for instance, a local intranet, a Personal Area Network, a LAN (Local Area Network), a WAN (Wide Area Network), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 110 may include a network of data processing nodes that are interconnected for the purpose of data communication.

In response to receiving the request 140 for initiating a secure session with the server 130, the system 400 may initiate detecting a DoS attack as described in further detail below.

Figure 2:
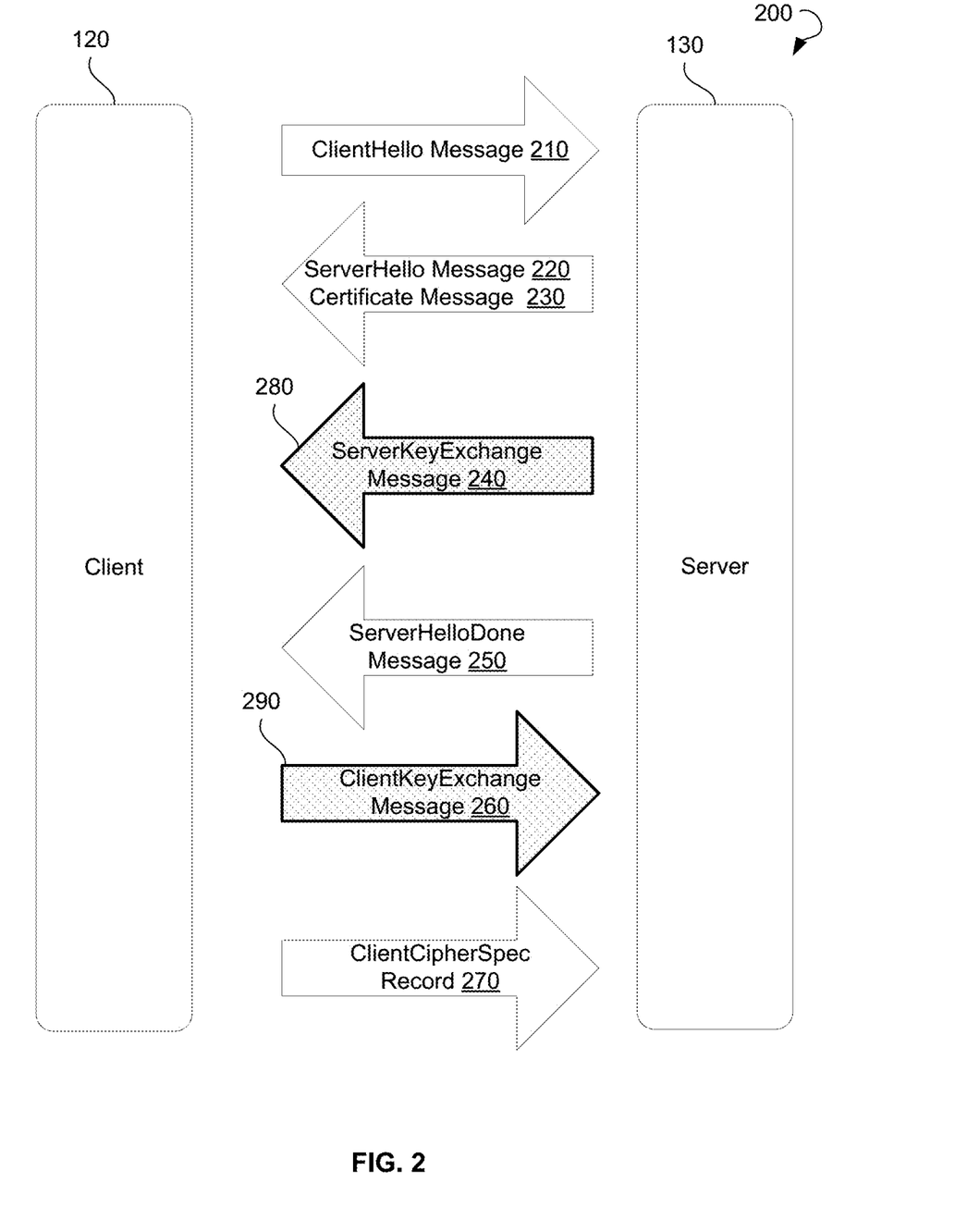
FIG. 2 is a schematic diagram of an SSL handshake procedure between a client and a server.

FIG. 2 is a schematic diagram of an SSL handshake procedure 200 between a client and a server, according to an example embodiment. The SSL handshake procedure 200 may commence with a ClientHello message 210 sent by the client 120 to the server 130. The ClientHello message 210 may include data related to the highest SSL protocol version the client 120 supports, a random number, a list of suggested cipher suites, compression methods, and so forth. The server 130 may respond with a ServerHello message 220. The ServerHello message 220 may include data related to the chosen protocol version, a random number, cipher suite, compression method from the choices offered by the client 120, and so forth. The server 130 may also send a Certificate message 230.

The server may further send a ServerKeyExchange message 240. The ServerKeyExchange message 240 may include a public key. The public key may be generated using key-agreement protocols, for example, by using ephemeral (transient) Diffie-Hellman (DHE) Key Exchange and ephemeral Elliptic Curve Diffie-Hellman (ECDHE) Key Exchange. The server 130 may further send a ServerHelloDone message 250 to the client to indicate that the server 130 has finished the handshake negotiation process.

The client 120 may send a ClientKeyExchange message 260, which may contain a premaster key or a public key depending on the selected cipher. The premaster key may be encrypted by the client 120 using the public key received from the server 130 in the ServerKeyExchange message 240.

The SSL handshake procedure 200 can also include sending a ClientcipherSpec record 270 by the client 120, in which the client 120 informs the server 130 that any further data received from the client 120 will be authenticated.

Arrows 280 and 290 show steps of the SSL handshake procedure 200 at which the server 130 may be exposed to attacks. For example, generating the public key to be sent in the ServerKeyExchange message 240 may be a resource-consuming process for the server 130. However, if the client 120 terminates the connection after receiving the ServerKeyExchange message 240, the resources of the server 130 for computation of the public key can be wasted. Additionally, the ClientKeyExchange message 260 may comprise random numbers instead of the premaster key generated by using the public key. The server 130 may spend time for computation of the erroneous premaster key received from the client 120 and, thus, may be depleted of resources.

Figure 3:
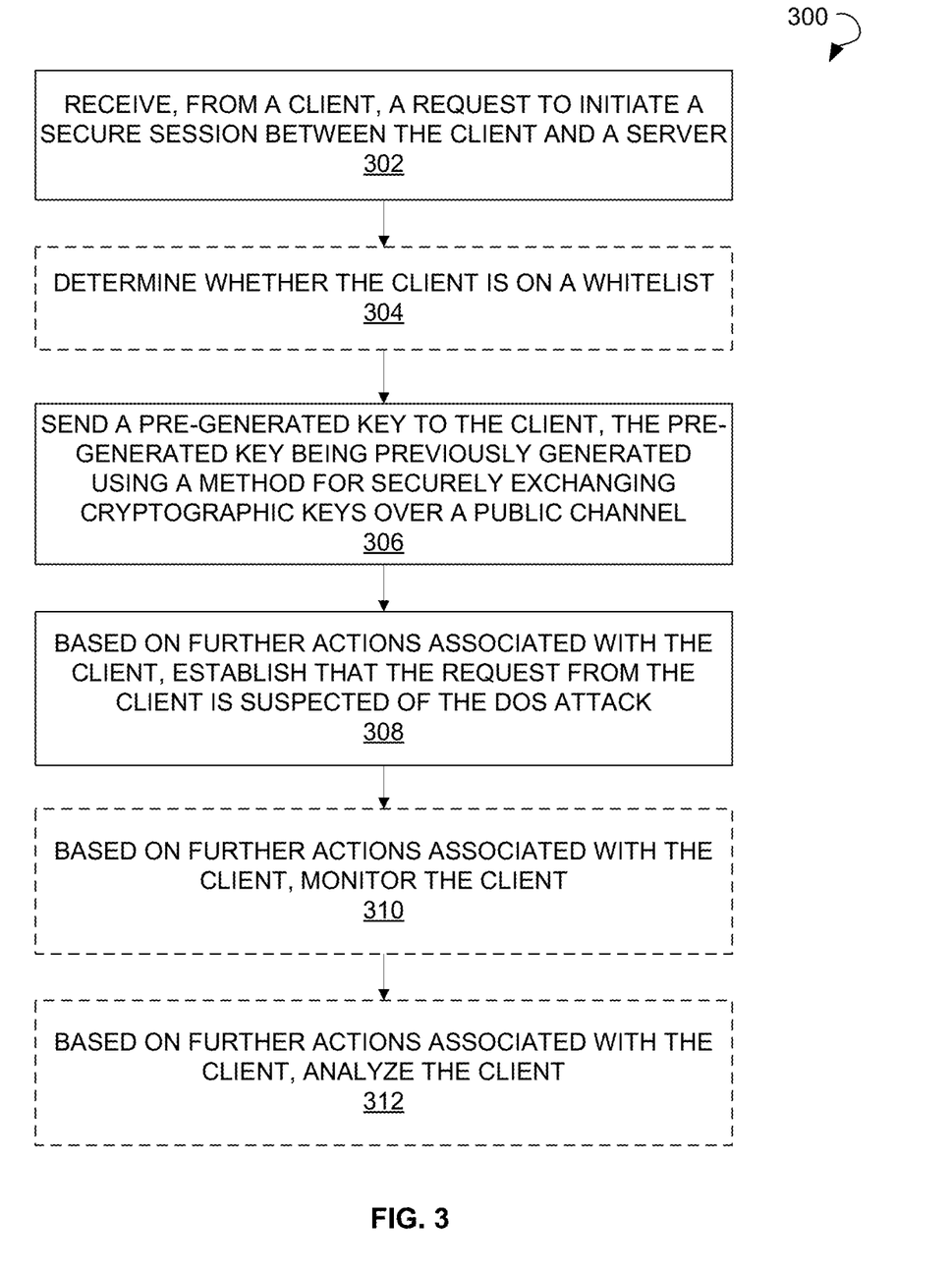
FIG. 3 is a process flow diagram showing a method for detecting a DoS attack when initiating a secure session.

FIG. 3 shows a process flow diagram of a method 300 for detecting a DoS attack when initiating a secure session, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with receiving, from a client, a request to initiate a secure session between the client and a server at operation 302. Receiving of the request from the client can initiate a handshake procedure being performed before initiating the secure session. The request may include an indication and the secure session between the client and the server may include a PFS cypher.

Optionally, the method 300 may continue with determining whether the client is on a whitelist at operation 304. In example embodiments, in response to the determination that client is absent from the whitelist, a pre-generated key may be sent to the client at operation 306. The pre-generated key may be previously generated by the server using a method for securely exchanging cryptographic keys over a public channel. In an example embodiment, the method for securely exchanging cryptographic keys over a public channel includes one or more of the following: DHE Key Exchange and ECDHE Key Exchange. The pre-generated key may include a public key of the secure session. Generation of the key may include the steps of creating long random numbers, taking a primitive root of the generated long random numbers, and performing modulo operations. The modulo operations can use the multiplicative group of integers modulo p, where p is prime, and g is a primitive root modulo p, and where $(g^a)^b=(g^b)^a=\mod p$; a and b being private keys of the client and the server, respectively.

The method 300 may further include establishing that the request from the client is suspected of the DoS attack at operation 308. The establishing may be performed based on further actions associated with the client. In an example embodiment, the further actions associated with the client include at least one of the following: closing the connection by the client after receiving the pre-generated key from the server and opening a new connection; absence of further data from the client after receiving the pre-generated key by the client; absence of further data from the client after sending a ClientKeyExchange message by the client, failure to finish the handshake procedure within a predetermined time frame; providing, by the client, data without calculating a pre-master key, using a pre-loaded private key by the client, and so forth. The calculation of the pre-master key may include encrypting the pre-master key with the pre-generated key.

Optionally, the method 300 may include operation 310, at which the client may be monitored based on the further actions associated with the client. Additionally, the method 300 may optionally include analyzing the client based on the further actions associated with the client. For example, to detect if an unknown client with a lot of requests sends the pre-loaded private key to the server, the server may send the same key to the client in a ServerKeyExchange message. The server may put the data of the ClientKeyExchange message received from the client into the database for analyzing. The server may check the analyzed result to investigate if the client is using a pre-loaded private key.

Additionally, for the case when the client uses the pre-loaded private key in the PFS handshake procedure, if the client does not enable session identifier (ID) reuse or enable session ID reuse but never sends back same session ID, the server may monitor the client and put the client into the database for analyzing.

Based on the establishing that the request from the client is suspected of the DoS attack, initiation of the secure session may be denied. Additionally, the client may be added to a blacklist. Any requests from clients on the blacklist may be automatically denied by the server without performing a SSL handshaking procedure.

Alternatively, based on a determination that client is present on the whitelist, the established secure session may be determined to be valid and a regular handshake procedure may be carried out and renegotiation of the secure session may be forced. More specifically, a new key may be generated using a method for securely exchanging cryptographic keys over a public channel during the regular handshake procedure and sent to the client.

Figure 4:
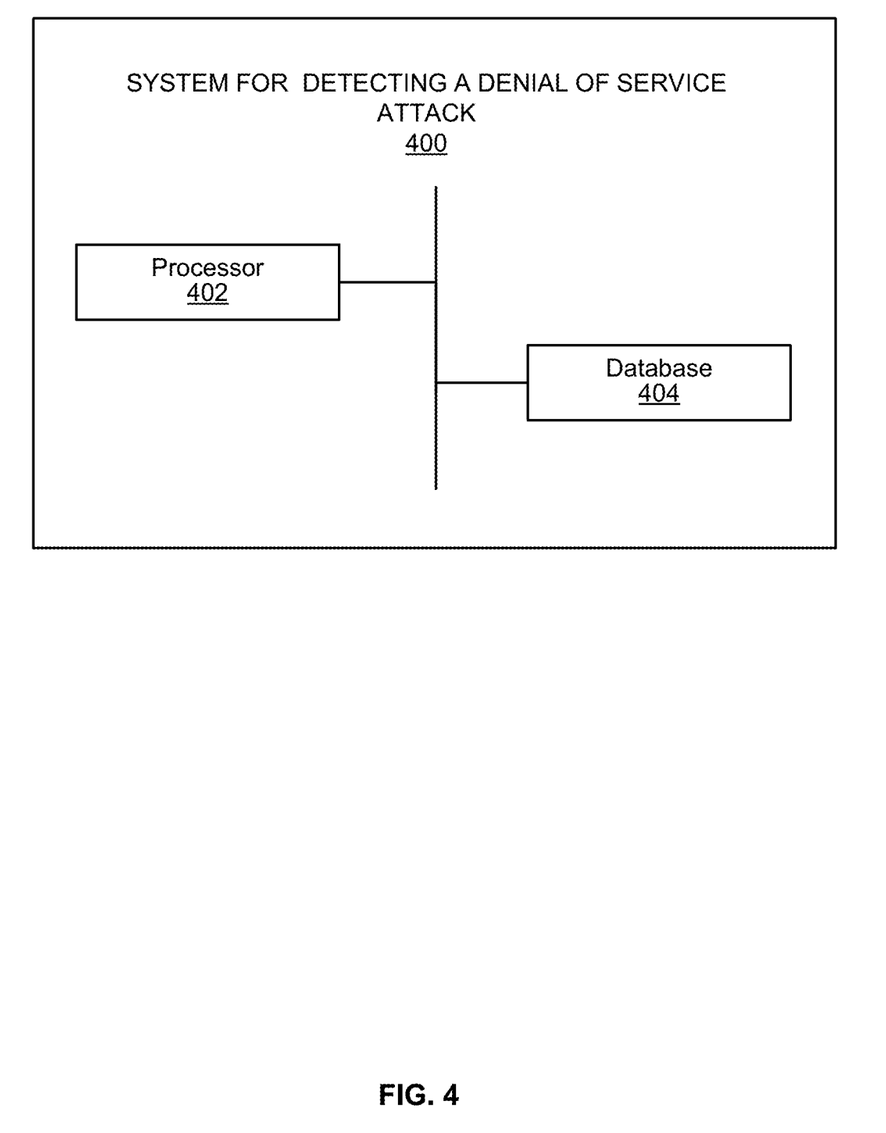
FIG. 4 is a block diagram of a system for detecting a DoS attack when initiating a secure session.

FIG. 4 shows a block diagram illustrating various modules of an example system 400 for detecting a DDoS attack when initiating a secure session. Specifically, the system 400 may include at least one processor 302. The processor 402 may be operable to receive, from a client, a request to initiate a secure session between the client and a server. In an example embodiment, the secure session includes a PFS cypher. The processor 402 may be optionally operable to determine whether the client is on a whitelist.

In response to the determination that client is absent from the whitelist, the processor 402 may be operable to send a pre-generated key to the client to establish a secure session. In an example embodiment, the pre-generated key may be previously generated by the server using a method for securely exchanging cryptographic keys over a public channel. The pre-generated key may be stored in the database 404. In an example embodiment, the method for securely exchanging cryptographic keys over a public channel includes at least one of the following: DHE Key Exchange and ECDHE Key Exchange.

The processor 402 may be further operable to establish, based on further actions associated with the client, that the request from the client is suspected of the DoS attack. In an example embodiment, the further actions associated with the client include at least one of the following: closing the connection by the client after receiving the pre-generated key from the server and opening a new connection; lack of further data from the client after receiving the pre-generated key; absence of further data from the client after receiving a ClientKeyExchange message from the client by the server; failure to finish the handshake procedure within a predetermined time frame; determining that the client provides data without calculating a pre-master key; using a pre-loaded private key by the client; and so forth. The calculation of the pre-master key may include encrypting the pre-master key with the pre-generated key.

The processor 402 may be further operable to monitor the client based on the further actions associated with the client. Optionally, the processor 402 may be further operable to analyze the client based on the further actions associated with the client.

Optionally, based on the establishing that the request from the client is suspected of the DoS attack, the processor 402 may be operable to deny initiation of the secure session and terminate the connection with the client. Additionally, based on the identification, the processor 402 may be operable to add the client to a blacklist.

Alternatively, based on a determination that client is on the whitelist, the processor 402 may determine the established secure session to be valid and may perform a regular handshake procedure and force renegotiation of the secure session. More specifically, the processor 402 may generate a new key using a method for securely exchanging cryptographic keys over a public channel during the regular handshake procedure and send the new key to the client.

The system 400 may further comprise a database 404 in communication with the processor 402. The database 404 may store computer-readable instructions for execution by the processor 402.

Figure 5:
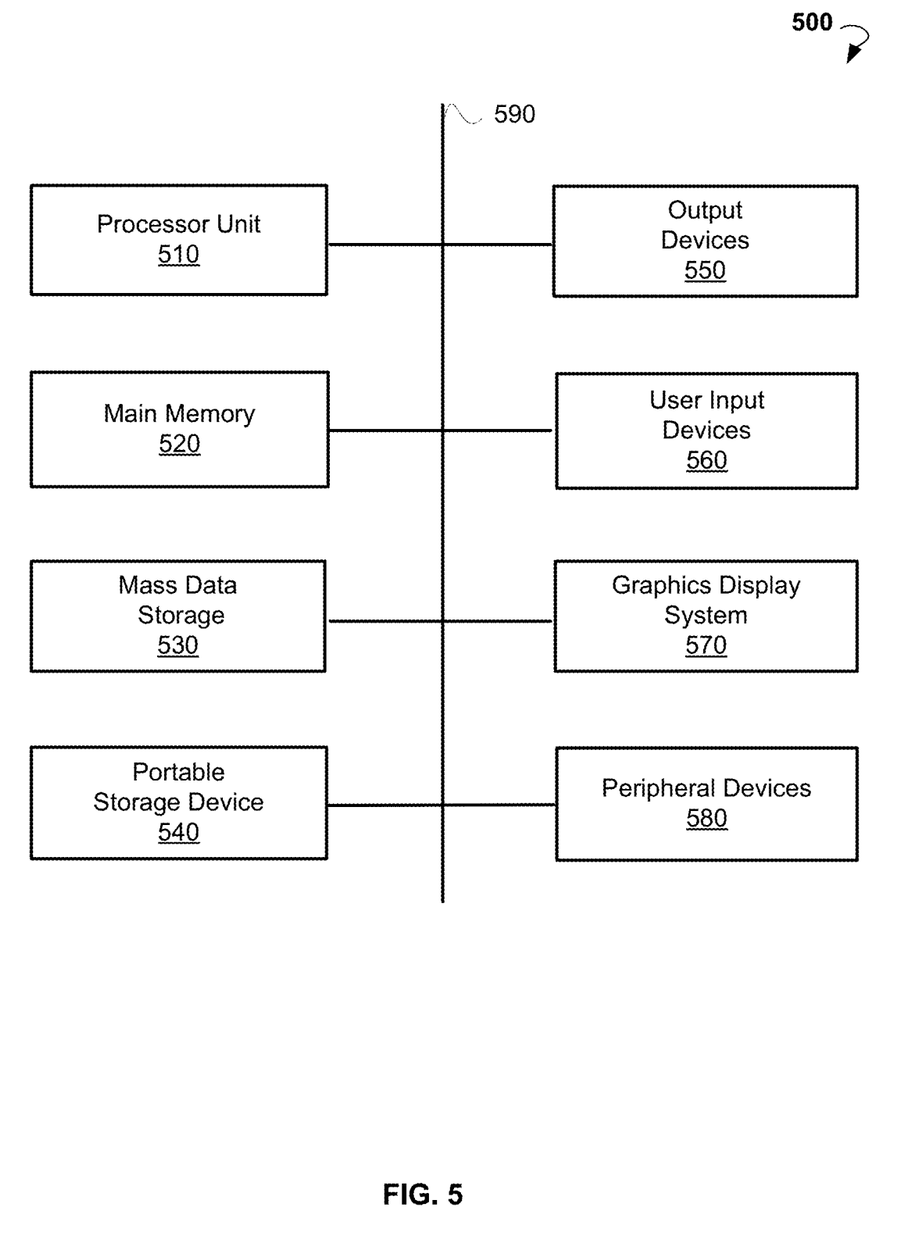
FIG. 5 shows a diagrammatic representation of a computing device for a machine, within which a set of instructions for causing the machine to perform any one or more of the methodologies discussed herein can be executed.

FIG. 5 illustrates an example computer system 500 that may be used to implement embodiments of the present disclosure. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor 510. Main memory 520 stores the executable code when in operation. The computer system 500 further includes a mass data storage 530, portable storage medium drive(s) 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor unit 510 and main memory 520 are connected via a local microprocessor bus, and mass data storage 530, peripheral device(s) 580, portable storage device 540, and graphics display system 570 are connected via one or more I/O buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a floppy disk, CD, DVD, or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for detecting a DoS attack when initiating a secure session have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for detecting a Denial of Service (DoS) attack when initiating a secure session, the method comprising:
   receiving, by a processor, a request from a client to initiate the secure session between the client and a server;
   determining, by the processor, whether the client is on a whitelist;
   based on a determination that the client is absent from the whitelist, sending, by the processor, a pre-generated key to the client, the pre-generated key being generated prior to receiving the request and being generated without a communication from the client using a method for securely exchanging cryptographic keys over a public channel the pre-generated key being disassociated from one or more secure sessions between the client and the server; and
   based on further actions associated with the client, wherein further actions include the client failure to finish a handshake procedure within a predetermined time frame, and the further actions performed by the client after the pre-generated key is sent to the client and prior to initiating the secure session, and
   based on a determination that the established secure session is invalid;
   identifying the request from the client as taking part in a denial of service attack; and
   based on the identification, denying initiation of the secure session.

2. The method of claim 1, wherein the further actions by the client include opening and closing connections by the client.

3. The method of claim 1, wherein the further actions associated with the client includes determining that the client is providing data without calculating a pre-master key.

4. The method of claim 1, wherein the further actions associated with the client include using, by the client, a pre-loaded private key.

5. The method of claim 1, wherein the secure session includes a Perfect Forward Secrecy (PFS) cypher.

6. The method of claim 1, further comprising, based on the further actions associated with the client, monitoring the client.

7. The method of claim 1, further comprising, based on the further actions associated with the client, analyzing the client.

8. The method of claim 1, wherein the method for securely exchanging cryptographic keys over a public channel includes one or more of the following: an ephemeral Diffie-Hellman (DHE) Key Exchange and an ephemeral Elliptic Curve Diffie-Hellman (ECDHE) Key Exchange.

9. A system for detecting a DoS attack when initiating a secure session, the system comprising:
   a hardware processor configured to:
      receive a request from a client to initiate the secure session between the client and a server;
      determining, by the processor, whether the client is on a whitelist;
      based on a determination that the client is absent from the whitelist, send a pre-generated key to the client, the pre-generated key being generated prior to receiving the request and being generated without a communication from the client using a method for securely exchanging cryptographic keys over a public channel the pre-generated key being disassociated from one or more secure sessions between the client and the server: and
      based on further actions associated with the client, wherein further actions include the client failure to finish a handshake procedure within a predetermined time frame, the further actions performed by the client after the pre-generated key is sent to the client and prior to initiating the secure session and,
      based on a determination that the established secure session is invalid;

identifying the request from the client as taking part in a denial of service attack; and
based on the identification, denying initiation of the secure session; and
a database in communication with the hardware processor, the database comprising computer-readable instructions for execution by the hardware processor.

10. The system of claim 9, wherein the further actions by the client include opening and closing connections by the client.

11. The system of claim 9, wherein the further actions associated with the client include determining that the client is providing data without calculating a pre-master key.

12. The system of claim 9, wherein the further actions associated with the client include using, by the client, a pre-loaded private key.

13. The system of claim 9, wherein the secure session includes a PFS cypher.

14. The system of claim 9, wherein the hardware processor is further configured to monitor the client based on the further actions associated with the client.

15. The system of claim 9, wherein the hardware processor is further configured to analyze the client based on the further actions associated with the client.

16. The system of claim 9, wherein the method for securely exchanging cryptographic keys over a public channel includes one or more of the following: a DHE Key Exchange and an ECDHE Key Exchange.

17. A non-transitory processor-readable medium having embodied thereon a program being executable by at least one processor to perform a method for detecting a DoS attack when initiating a secure session, the method comprising:
receiving a request from a client to initiate the secure session between the client and a server;
determining, by the processor, whether the client is on a whitelist;
based on a determination that the client is absent from the whitelist, sending a pre-generated key to the client, the pre-generated key being generated prior to receiving the request and being generated without a communication from the client using a method for securely exchanging cryptographic keys over a public channel the pre-generated key being disassociated from one or more secure sessions between the client and the server; and
based on further actions associated with the client, wherein further actions include the client failure to finish a handshake procedure within a predetermined time frame, and the further actions performed by the client after the pre-generated key is sent to the client and prior to initiating the secure session, and
based on a determination that the established secure session is invalid;
identifying the request from the client as taking part in a denial of service attack; and
based on the identification, denying initiation of the secure session.

* * * * *